United States Patent [19]

Lerner et al.

[11] 4,412,876
[45] Nov. 1, 1983

[54] LABELING APPARATUS

[75] Inventors: Bernard Lerner, Peninsula; Dana J. Liebhart, Streetsboro, both of Ohio

[73] Assignee: Automated Packaging Systems, Inc., Twinsburg, Ohio

[21] Appl. No.: 281,281

[22] Filed: Jul. 7, 1981

[51] Int. Cl.³ .......................................... B32B 31/00
[52] U.S. Cl. ...................................... 156/64; 53/291;
53/297; 53/585; 156/86; 156/212; 156/443;
156/510; 156/566
[58] Field of Search ................. 156/86, 443, 367, 350,
156/362–363, 566, 567, 212; 53/291–298; 367,
585; 198/429, 456, 689

[56] References Cited

U.S. PATENT DOCUMENTS

| | | | |
|---|---|---|---|
| 2,751,735 | 6/1956 | Bartlett et al. | 53/297 X |
| 2,846,835 | 8/1958 | Aguilar et al. | 53/291 |
| 3,889,801 | 6/1975 | Boyer | 198/689 |
| 3,974,628 | 8/1976 | Konstantin | 53/297 X |
| 4,102,728 | 7/1978 | Smith | 53/297 X |

*Primary Examiner*—David A. Simmons
*Attorney, Agent, or Firm*—Watts, Hoffmann, Fisher & Heinke

[57] ABSTRACT

Apparatus for applying tubular labels to containers comprised of structure defining a labeling station, a container directing unit for directing a succession of containers to the labeling station, a label feeding unit for positioning individual labels at a predetermined position with respect to the labeling station, label applying mechanism including a label engaging device cyclically movable along a path of travel for removing a label from the feeding unit and assembling the label about a container at the labeling station, and a drive unit for imparting harmonic motion to the label engaging device.

29 Claims, 9 Drawing Figures

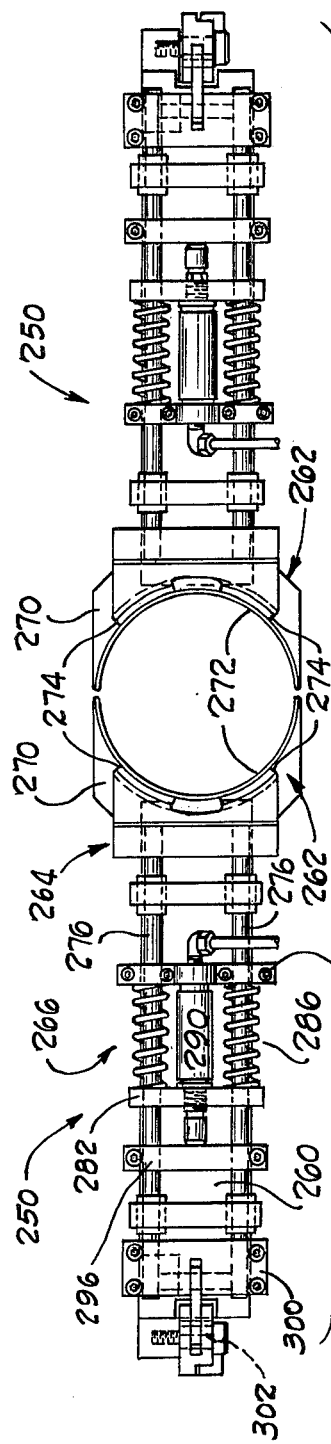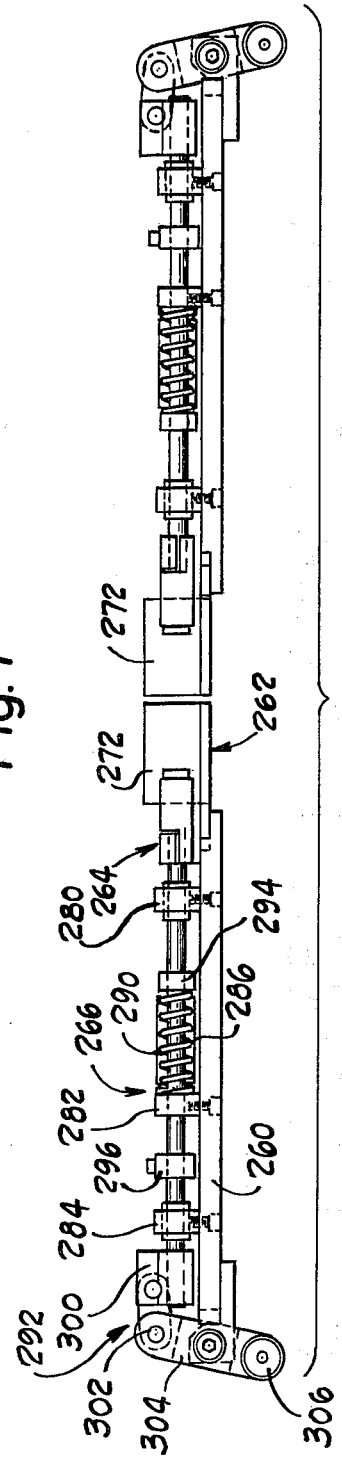

LABELING APPARATUS

DESCRIPTION

1. Technical Field

The present invention relates to placing labels on containers and more particularly relates to apparatus for placing flexible tubular labels on containers.

2. Background Art

Labeling product containers, such plastic bottles or jugs, has been a time consuming procedure compared to the rates at which the containers are filled with product and packed. When these kinds of containers were first introduced labeling information was applied to the containers by silk screen processes. Later, preprinted plastic sleeves were used as labels. The sleeves were at first applied by hand for subsequent heat shrinking into tight contact with the containers.

Because manual assembly was slow, machines were constructed for placing the tubular labels on the containers. While prior machines materially speeded up the labeling process as compared with manual labeling, they were still not capable of extremely high speed operation such as is necessary in a soft drink bottling plant where production rates are great.

The machines in question were constructed rather typically for the packaging industry in that the movement sequence of operation of coordinated parts of the machinery was effected primarily by pneumatic actuators associated with position sensitive electric or pneumatic switches and related valve controllers. The time required for control switches and valve controllers to operate created dwell periods at the ends of actuator strokes and delays between sequential operations which materially lenghtened the cycle time of the machines. Use of these actuators also gave rise to machine component accelerations and inertial forces large enough to cause damage to machine component parts and to labels when attempts were made to operate the machines at desirably high production rates.

DISCLOSURE OF THE INVENTION

The present invention provides a new and improved apparatus for applying labels to containers wherein tubular labels are individually removed from a supply of labels, expanded and positioned about a container by a continuously operating harmonically moving label applying assembly. Label applying apparatus constructed according to the invention is capable of operation at extremely high production rates.

In a preferred embodiment of the invention, apparatus for placing tubular labels on containers is provided comprising structure defining a labeling station, a container directing unit for delivering successive containers to the labeling station, a label feeding unit for positioning labels for assembly to containers, a label applying mechanism including a label engaging device for removing a label from the storage section and placing the label on a container at the labeling station, and a drive unit for moving the label engaging device harmonically along a path of travel between the labeling station and the label feeding unit for labeling successive containers at the labeling station.

A preferred label applying mechanism includes cam structures coacting with the label engaging device during motion along the path of travel to manipulate the label onto a container at the loading station.

The drive unit is drivingly associated with a controller which produces output control signals indicative of the precise location of the label applying assembly on its path of travel. These signals are used to coordinate operation of the label applying assembly with other components of the labeling apparatus.

The preferred embodiment of the invention employs a cyclically operated container feeding mechanism which is driven from the drive unit via a normally disengaged clutch. The clutch is engaged in response to generation of position control signals indicative of the label applying assembly being clear from the path of travel of containers to and from the labeling station.

The illustrated and preferred container feeding mechanism includes a container engaging advancing member which is harmonically moved to advance containers seriatim to the labeling station. The advancing member is driven by a rod and crank which are clutched and declutched from the drive unit when the advancing member is in a predetermined position.

The container engaging advancing member is preferably an L shaped plate which reciprocates across a container feed conveyor from a rest position to container pushed position. As the plate advances from its rest position to the container pushed position, it pushes a container into a passage extending transversely through the labeling apparatus. As machine is first placed in use repetitive cycling of the plate establishes a row of containers along a path of travel through the passage which path includes the labeling station. Once the labeling machine is cycled to apply labels, the plate is reciprocated to push the row one bottle diameter in synchronization with the labeling operation as the label feeding unit is near the top of its travel to grasp another label for a succeeding cycle. This pushing moves the row one bottle diameter expelling a labeled bottle from the passage and inserting a new and unlabeled bottle in the passage. Thus, each cycle of the pusher advances the row a distance which is a whole integer multiple of a diameter of one of the bottles being labled.

At the labeling station, there is a perforate bottle support which is coupled to a source of vacuum. A vacuum source cooperates with the perforate body support and establishes a pressure differential on the bottle to be labeled which secures and stabilizes the bottle at the station. While the bottles in the row are touching, as the label is brought down over the bottle at the labeling station it is able to force its way between the just labeled bottle downstream from the station and the next to be labeled bottle upstream from the station. This is true because the bottles are light and there is nothing to interfere with a slight amount of bottle movemeng which may be required for the label to pass between the adjacent bottles.

As the L shaped plate advances so that one face of the L is pushing a new bottle into the row and advancing the row, another face of the L shaped plate is effective to block bottle feed along the container feed conveyor. After the plate has retracted substantially to its rest position, the bottle feed conveyor advances another bottle into the space between the just pushed bottle and the plate to supply a bottle for the next pushing cycle.

The preferred labeling apparatus employs tubular labels detachably secured together in web form. Successive labels are connected along lines of weakness in the web so that each label can be torn off the web and placed on a container. The labels are preferably marked with indicia which are not readily visible in ambient light yet are responsive to stimulating radiation. The apparatus is equipped with an indicia detector which detects the position of a label near the end of the web and produces an output signal for maintaining the web in the detected position. The preferred detector is responsive to light of about 3660 angstrom units. The preferred indicia and their methods of use are more fully described in co-pending application Serial No. 166,500 filed July 7, 1980 by Hershey Lener and Bernard Lerner for Continuous Web Registration which is here-by incorporated by reference in its entirety.

Label feed and placement over a bottle at the labeling stations is accomplished through a novel and improved labeled clamping and cam arrangement.

A pair of spaced, vertically reciprocatable, clamp assemblies are provided. Each clamp assembly includes coacting jaws which are spring biased into clamping arrangement as the label is being fed. The clamps and cams coact as the clamps are reciprocated as follows:

(1) to clamp a label positioned at a clamp station when the clamps are at or near the top their movement;

(2) to separate the label from the web as the next label of the web is moved to the clamping station and braked there in response to a signal from the indicia detector;

(3) to move the clamps away from one another and stretch the clamped label as the clamps move downwardly toward the labeling station;

(4) to cam release the jaw action against the action of springs after the label has reached a desired position around the bottle being labled; and, (5) On return, air actuators open the jaws of the clamp and the camming arrangement is effective to move the clamp assemblies into clamping alignment with the next label.

BRIEF DESCRIPTION OF THE DRAWINGS

FIG. 7 is a top plan view of a portion of a label applying assembly forming part of the apparatus of FIG. 1;

FIG. 8 is a front elevational view of the apparatus of FIG. 7, and

BEST MODE FOR CARRYING OUT THE INVENTION

Figure 1:
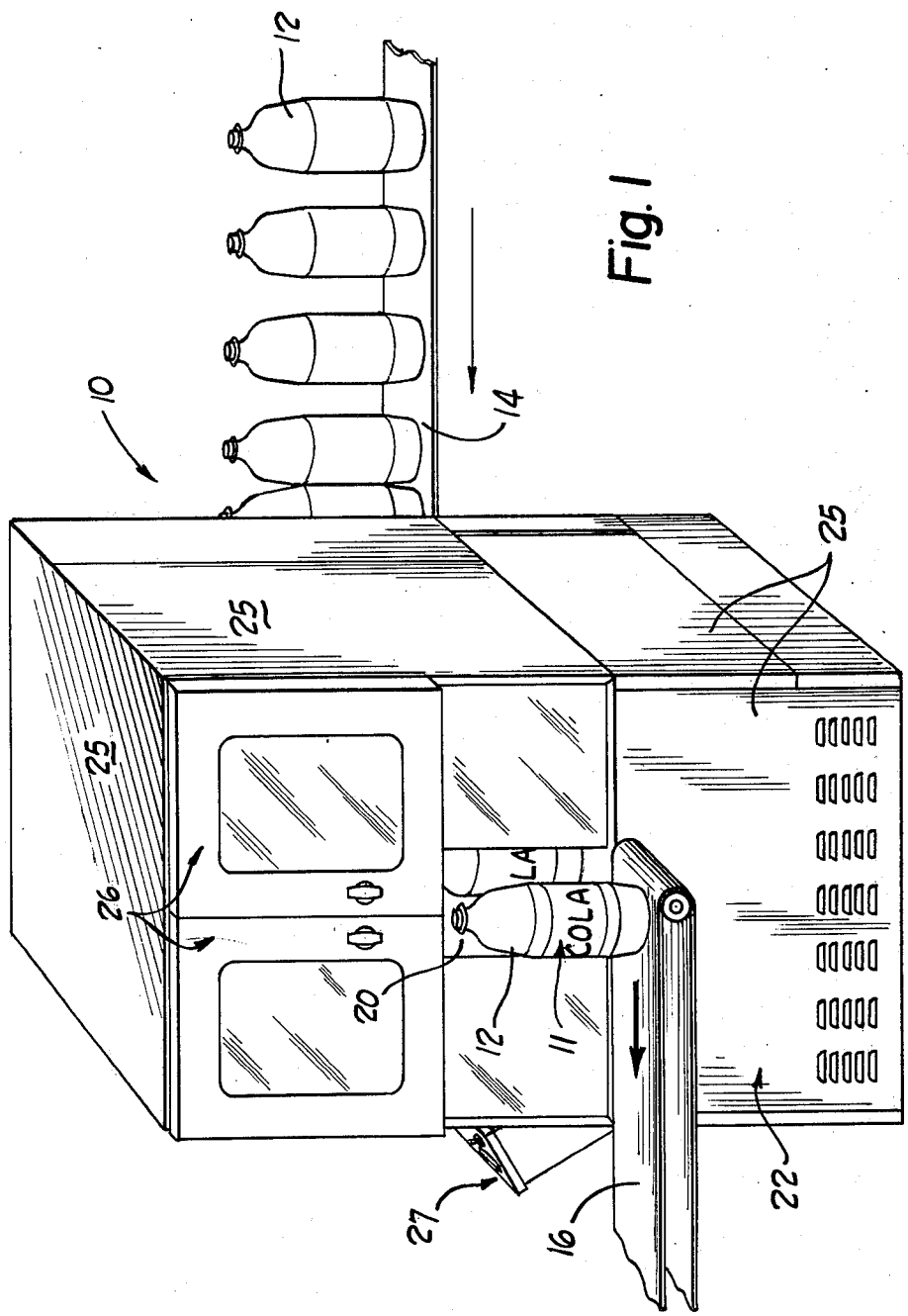
FIG. 1 is a perspective view of apparatus embodying the present invention.
Figure 2:
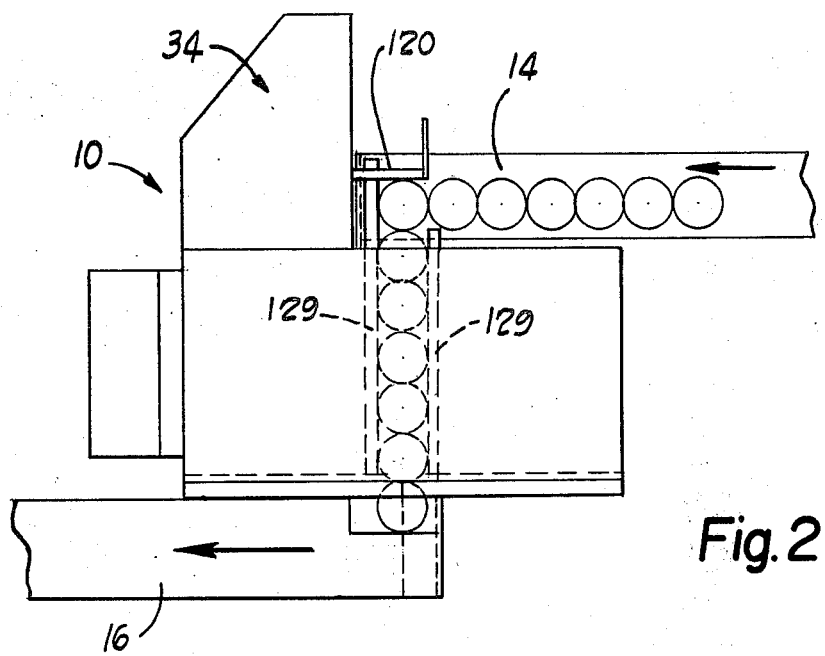
FIG. 2 is a top plan view of the apparatus of FIG. 1.

Labeling apparatus 10 for applying sleeve-like plastic labels 11 to containers 12 is illustrated by FIGS. 1 and 2 of the drawings. The illustrated labeling apparatus 10 is disposed between the container feed conveyor 14, from which containers are introduced into the apparatus 10, and a container delivery conveyor 16 to which labeled containers are directed from the apparatus 10. The containers, illustrated as being in the form of plastic soft drink bottles, are fed between the conveyors 14, 16 via a through passage 20 in the apparatus 10.

The preferred labeling apparatus 10 includes a base 22 formed by a framework of structural steel members (see FIGS. 3–5) welded together and defining a horizontal support face 23 on its upper side. A vertical support assembly 24 projects upwardly from the support face 23 and comprises, in the preferred embodiment, a vertical plate 24a and plate supporting brackets 24b. The base 22 and support assembly 24 are covered by suitable housing panels 25 and access doors 26 (FIGS. 1 and 2). An operator accessible control panel 27 is located along one side of the apparatus.

As illustrated by FIGS. 2–5, the apparatus 10 includes a label supply system 30, a labeling station 32 at which successive containers 12 have respective labels 11 assembled to them; a container directing unit 34 for feeding containers 12 to the labeling station; a label feed unit 36 for positioning individual labels relative to the labeling station 32; a label applying mechanism 40 for removing individual labels from the feed unit 36 and placing them on individual containers at the labeling station 32; and, a drive unit 42 for which the container directing unit 34 and label applying mechanism 40 are operated. The operation of the container directing unit 34 and the label applying mechanism, as well as other components of the apparatus 10 are coordinated, in part, by a controller system 14 FIG. 4 driven from the drive unit 42.

Figure 3:
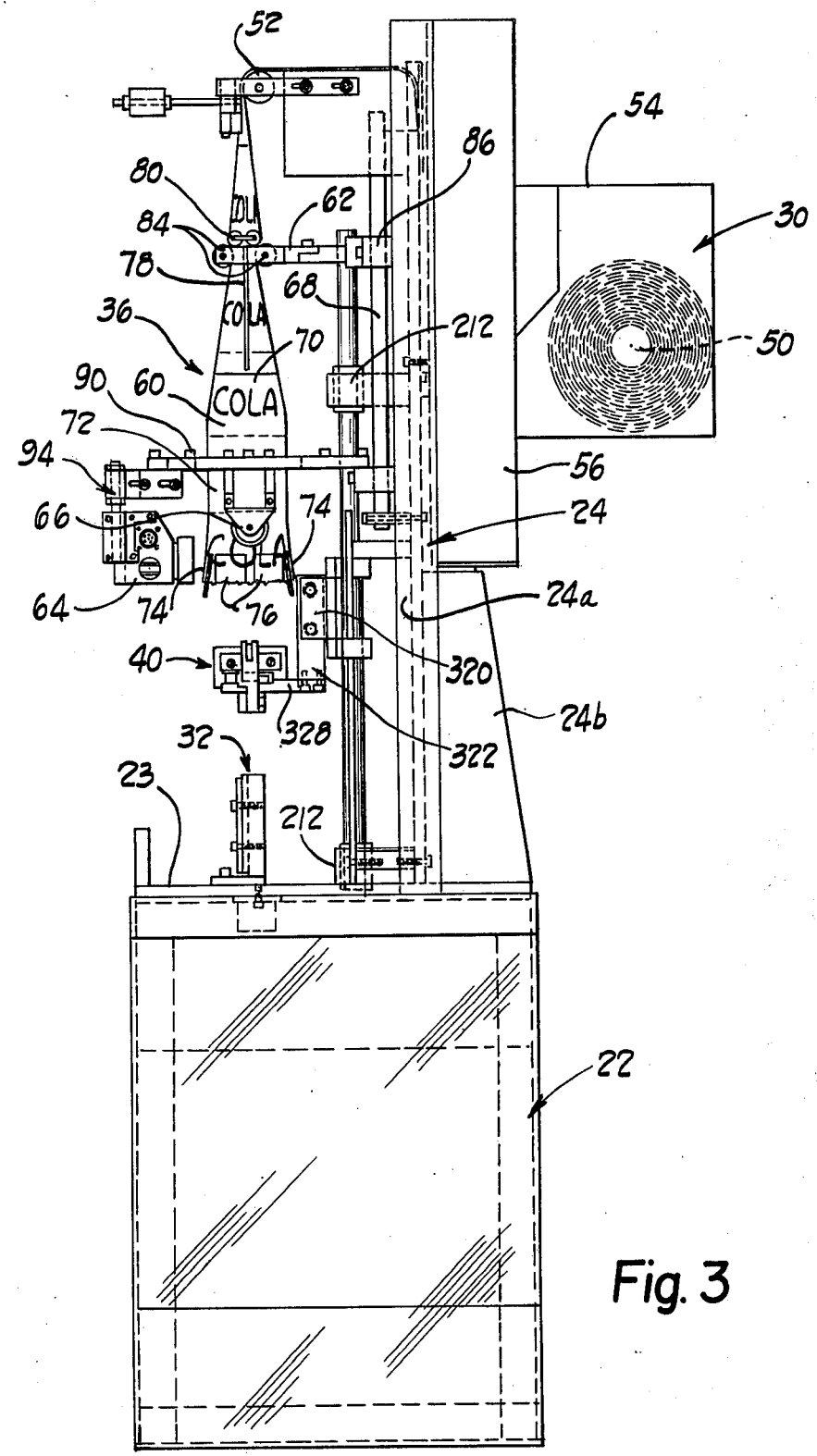
FIG. 3 is a side elevational view of the apparatus of FIG. 1 with parts removed.

The labels 11, in the preferred embodiment, are tubular and formed of a resiliently preprinted stretchable plastic film material, such as polyethylene plastic. As shown by FIG. 3, successive labels are detachably connected to each other to form a tubular web. Adjacent ends of the labels are defined by lines of web weakness, e.g., by lines of perforations across the web. The illustrated web is flat and spirally rolled for storage although other storage techniques could be employed. The web can be constructed as described in copending application Ser. No. 166,499 filed July 7, 1980, the disclosure of which is incorporated herein by this reference to it. In the disclosed embodiment the labels are resiliently expanded as they are assembled to the containers so that the labels resiliently hug the containers after assembling and thus remain in place.

The label supply system 30 contains a supply of labels which is fed from the supply system at a controlled rate as required by the labeling procedure. The system 30 is illustrated as containing a web supporting structure 50 on which a spirally wound web of labels in roll or coil form is illustrated. The web is unrolled as successive labels forming the web are detached and placed on containers. A feed motor and web tensioning mechanism, not illustrated, are utilized to control the paying out of labels from the web roll. The web is trained over a delivery roll 52 from which it is directed to the label feed unit 36. The various components of the supply system 30 can be of any suitable or conventional construction well known to those skilled in the art and accordingly the constructional details of the supply system 30 are not illustrated or described further. The components of the supply system 30 are disposed within sheet metal housings indicated by reference characters 54, 56.

The label feed unit 36 receives the web from the supply system 30, expands the labels and positions individual label for separation from the web and placement on a container by the label applying mechanism 40. The feed unit 36 is illustrated by FIG. 3 and includes a web spreading mandrel 60 suspended from a mandrel support 62, a web position detector 64, web brakes 66 which coact with the mandrel 60 under control of the position detector 64, and supporting rods 68 fixed to the vertical support plate 24a.

The mandrel 60 extends inside the tubular web and the web is expanded as it passes over the mandrel. The mandrel 60 is formed by a tubular sheet metal or plastic body having a frusto conical section 70 at its upper end and a generally cylindrical skirt 72 forming its lower end. Outwardly spring arms 74 are disposed at the lower end of the skirt for tensioning the bottom edge of the label disposed about the mandrel skirt 72. The skirt 72 is provided with pairs of cut-outs 76 on its lateral sides for enabling a label supported about the base of the skirt to be gripped and pulled downwardly relative to the mandrel. A supporting tongue 78 extends upwardly from the body 70 and carries rollers 80 which coact with the mandrel support 62 to enable the label web to pass over the rollers 80 and then the mandrel.

The mandrel support 62 is preferably formed by a support arm (see FIG. 3) which carriers rollers 84 on its projecting end. The rollers 84 support the mandrel rollers 80 and the label web is fed between the respective pairs of rollers. The support arm is adjustably positionable vertically relative to the apparatus by clamps 86 acting between the arm 82 and the vertical support rods 68.

The web position detector 64 senses indicia on each successive label when such label is properly positioned with respect to the mandrel 60 and produces a web brake operating signal. The web position indicia are accurately located on each label and the detector 64 and mandrel 60 are positioned so that the lowermost edge of each label is aligned with the detector 64 is preferably designed to detect wave shifted light emitted by a normally invisible, or nearly invisible, registration mark printed on each label. The preferred detector 64 can be constructed as disclosed by United States application Ser. No. 253,193 filed Apr. 27, 1981 and entitled "Control Marking Detector," the disclosure which is incorporated herein in its entirety by this reference to it. Because additional details of the construction and operation of the detector 64 can be had by consulting the above referenced application, no further detailed description is necessary here.

The detector 64 is adjustable supported relative to the labeling station 32 by a support assembly 90 (see FIG. 3). The support assembly 90 includes clamps 92 by which the assembly 90 is connected to the supporting rods 68 to enable the support assembly 90 to be adjustably positioned vertically as desired and clamped in place. The assembly 90 is formed by a plate-like body projecting outwardly from the rods 68 and defining a central opening in which the mandrel 60 is disposed. The detector 64 is connected to the support assembly 90 by a position adjusting mechanism 94 to enable its further adjustment vertically relative to the mandrel.

Figure 4:
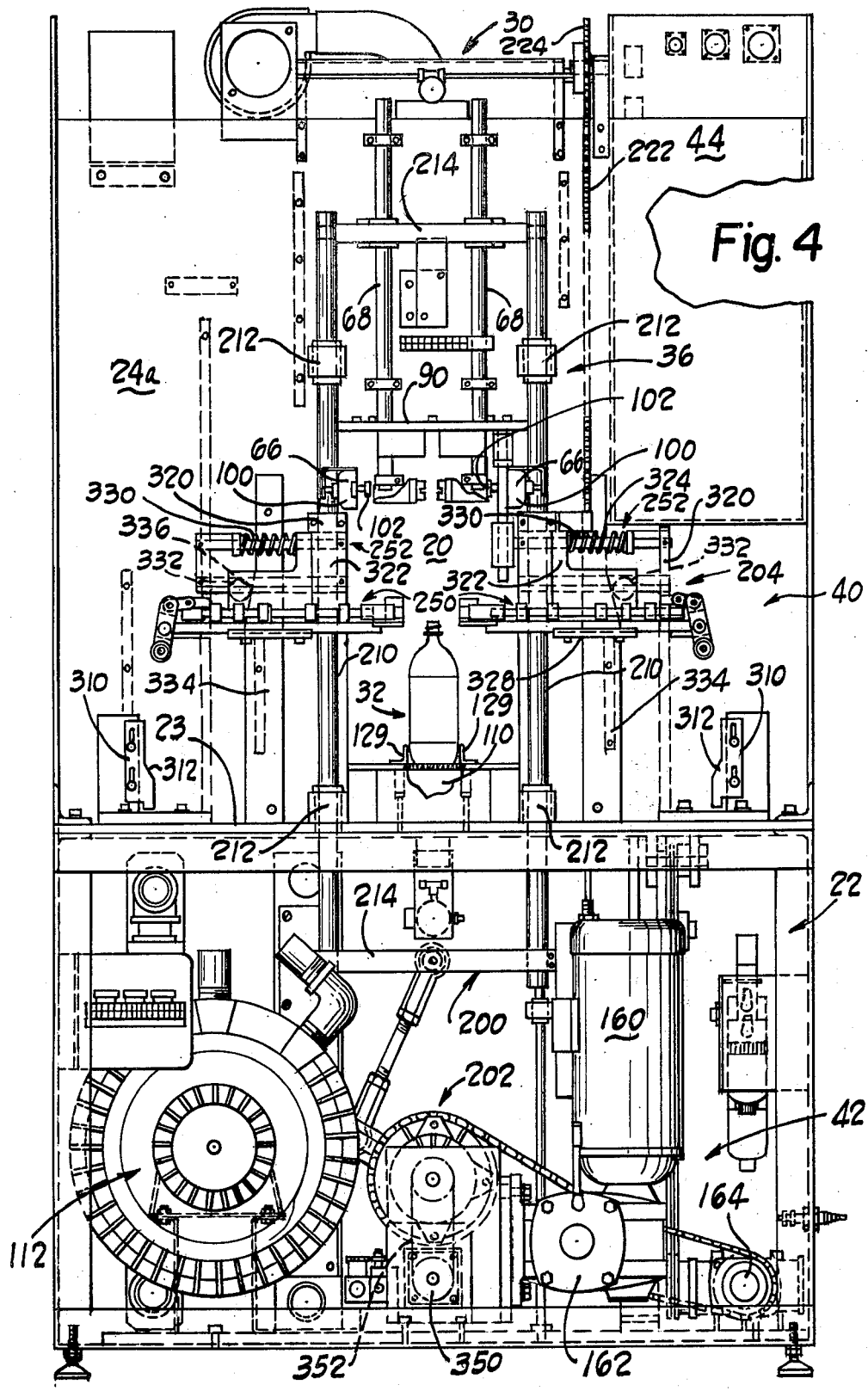
FIG. 4 is a front elevational view of the apparatus of FIG. 3 having portions removed and parts broken away.

Each web brake 66 is disposed on a respective lateral side of the mandrel 60 and rigidly suspended from the support assembly 90 (see FIG. 4). Each web brake includes a solenoid assembly 100 fixed to the support assembly 90 and a brake pad 102 which is positioned on the solenoid armature adjacent the mandrel. When the solenoid assembly 100 is energized, the brake pad 102 is rapidly moved into engagement with web material surrounding the mandrel. The force of engagement between the brake pads and the web is sufficiently great that the web is prevented from moving relative to the mandrel. Thus when the label applying assembly is removing a label from the mandrel for assembly to a container, application of the web brakes 66 severs the label carried by the label applying assembly from the web. When the web is thus severed, the label with which the web brakes are engaged is positioned with its newly severed, lower edge aligned with the bottom of the mandrel 60. The solenoid assembly 100 is energized by virtue of an output signal from the detector 64 indicating that a registration mark on the label has arived at a predetermined location with respect to the mandrel. The brakes are energized momentarily; but long enough to assure severance of the web. The brakes are then deenergized to free the web.

The labeling station 32 is disposed below the mandrel 60 so that the label applying mechanism 40 can pull the severed label downwardly over the container at the labeling station. In the preferred and illustrated embodiment the container is positioned at the labeling station on one wall of a vacuum manifold 110 (see FIG. 4) having a perforate grate-like upper wall section on which the container 12 is positioned. The container is maintained upright and stable by the differential pressure acting on the container. The vacuum pressure in the manifold 110 is created by a centrifugal vacuum pump 112 disposed within the structural framework forming the base 22. The vacuum pump inlet is hermetically connected to the manifold 110 by conventional hose, not illustrated.

Figure 6:
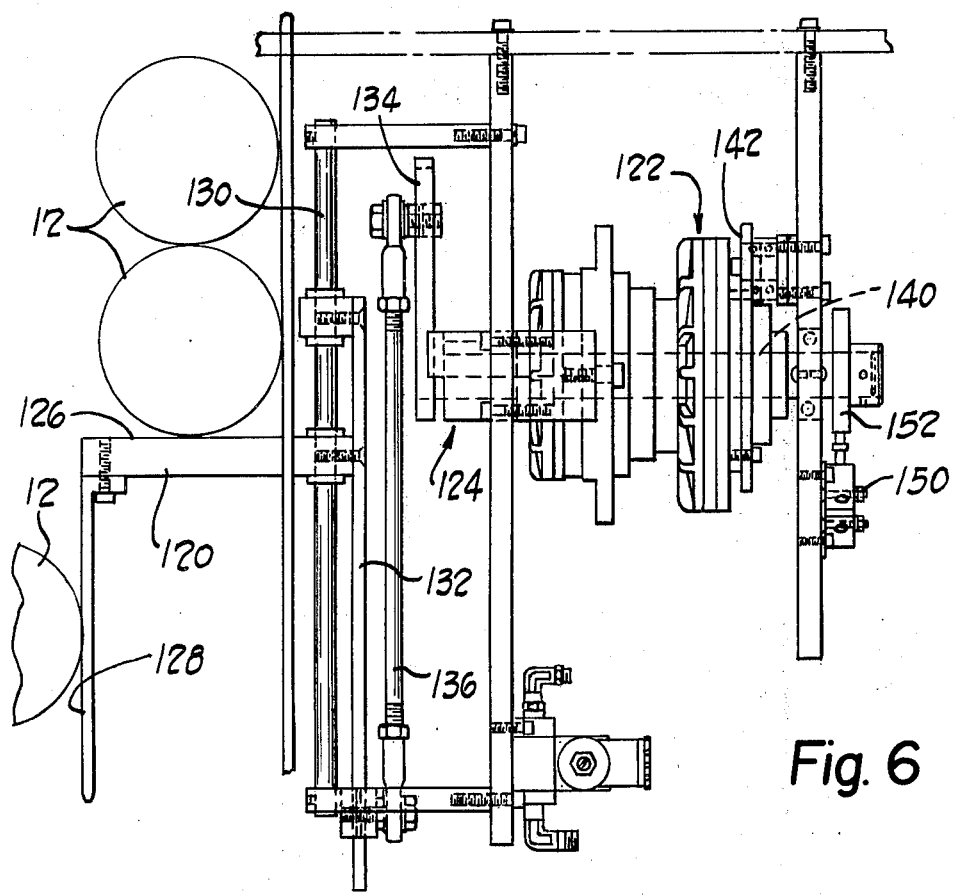
FIG. 6 is a top plan view of a container directing unit forming part of the apparatus of FIG. 1.
Figure 5:
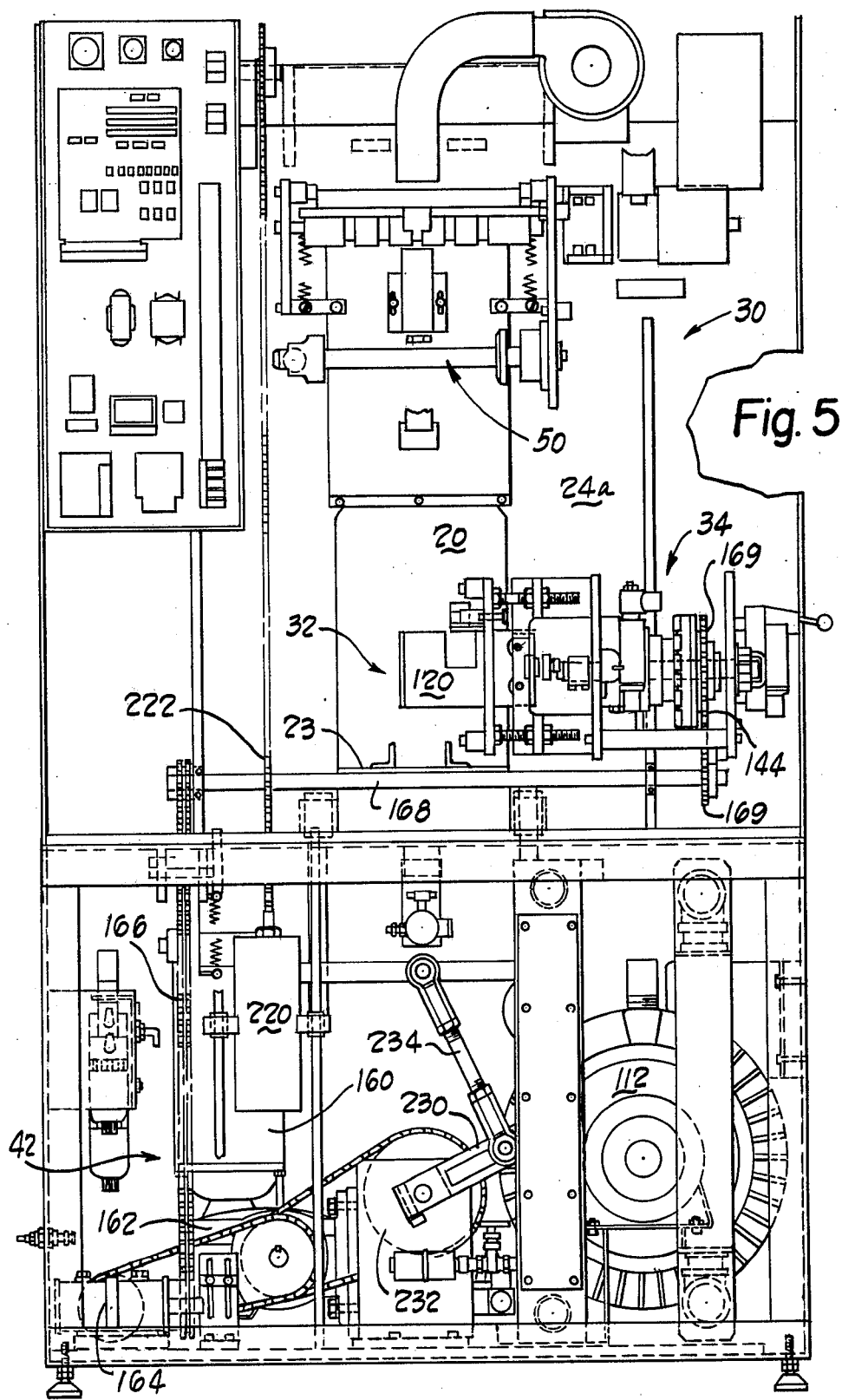
FIG. 5 is a rear elevational view of the apparatus of FIGS. 3 and 4.

The container directing unit 34 removes containers one at a time from the conveyor 14, advances the containers one by one to the labeling station 32 in timed relation to operation of the label applying mechanism 40 and then advances the containers to the delivery conveyor 16. Referring to FIGS. 2, 5 and 6 the unit 34 comprises a container advancing member 120 which is driven from the drive unit 42 via a clutch 122 and a harmonic drive transmission 124. The member 120 is generally L-shaped having a container pushing face 126 and a container abutting face 128. The member 120 is reciprocated by the drive transmission 124 and functions to "cut" a container from the line of containers on the conveyor 14 and to push that container a predetermined distance into the passage 20. While a container is being pushed into the apparatus the next succeeding container on the conveyor 14 is moved into abutment with the face 128. When the member 124 returns to its original position the succeeding container is moved by the conveyor into position for engagement by the pusher face 126 during the next cycle of operation.

Containers 12 in the apparatus 10 remain in abutment with each other so that when an additional container is pushed into the passage 20, all the containers are advanced and one container is discharged to the conveyor 16. The containers in the passage 20 are guided along a predetermined path by container engaging guide rails 129 which extend along the lateral sides of the containers in the passage 20, except at the labeling station 32.

The illustrated container advancing member 120, is slidably disposed on a guide rod 130 (FIG. 6) and fixed to a reciprocating link member 132. The link member 132 is connected to a crank 134 via a connecting rod 136. The crank 134 is driven from a drive shaft 40 which extends from the crank 134 through the clutch 122. The shaft 140 connected to the output section of the clutch 122 so that when the clutch is engaged the advancing member is reciprocated harmonically along the guide rod. The clutch input is continuously driven from the drive unit 42 via a chain drive transmission.

The clutch 122 is electrically operated and when deenergized is disengaged so that the member 120 is stationary. This is the normal condition of the clutch and the container advancing member 120 is normally disposed in the position illustrated by FIG. 2. When the clutch 122 is energized, the member 120 moves to advance the containers in the apparatus 10 a predetermined distance through the passage 20 (as illustrated by FIG. 6) and is then retracted to its normal position. When the member 120 has completed a cycle of its motion, the clutch 122 is deenergized. In the illustrated apparatus the clutch is deenergized by operation of a mechanical switch 150 which is opened by a cam 152 disposed on the end of the shaft 140. The switch 150 remains closed to energize the clutch whenever the pusher member is away from its normal position. The container engaging member 120 cycles quickly as compared to the operation of the label applying mechanism and the operation of the member 120 is timed to coincide with a period of time in which the label applying mechanism is not in a position to interfere with movement of the containers through the apparatus 10.

The connection between the connecting rod 136 and the crank 134 is adjustable to adjust the stroke of the member 120. This permits different wized containers to be pushed through the apparatus 10 while assuring their being accurately positioned at the labeling station 32.

In the preferred and illustrated embodiment of the invention, the drive means 42 comprises an electric motor 160 having its output associated with a gear reduction 162. The gear reduction output shaft is keyed to a set of sprockets from which both the container directing unit 34 and the label applying mechanism 40 are driven. As is best illustrated by FIG. 5, the container directing unit 34 is driven from the gear reduction 162 through a right angle gear drive unit 164, a chain 166, a cross shaft 168 and a chain and clutch input sprocket 169.

The label applying mechanism 40 comprises a reciprocating support frame 200, a harmonic drive transmission 202 between the drive unit 42 and the frame 200, and a label gripper assembly 204 carried by the frame 200. The gripper assembly is effective to grip the label positioned at a clamping station at the lower end of the mandrel 60 and pull the label downwardly over a container at the labeling station. The gripper assembly 204 releases the label when properly positioned on the container and is then driven upwardly again to repeat the label applying cycle.

The support frame 200 comprises a pair of parallel cylindrical support shafts 210 supported adjacent the plate 24a by slide bearings 212 projecting from the plate 24a to enable the shafts 210 to reciprocate vertically along the plate 24a. Opposite ens of the shafts 210 are fixed together by tie rods 214. Because of the weight of the support frame 200 and the label gripper assembly 204, a counter weight 220 (FIG. 5) is suspended behind the support plate 24a and connected to the support frame 200 by a chain 222 reeved around a sprocket 224 supported at the upper end of the plate 24a. The counterweight 220 assures that the label applying mechanism 40 is harmonically reciprocated quickly, yet smoothly and without subjecting parts of the apparatus 10 to unduly large inertial forces.

The illustrated harmonic drive 202 for the supporting frame 200 comprises a crank arm 230 driven from the motor 160 and the gear reduction 162 via a chain and sprocket 232. A connecting rod 234 extends between the crank arm 230 and the adjacent one of the tie rods 214. As the motor 160 operates, the support frame 200 is subjected to sinusoidal harmonic motion via the crank 230 and rod 234 so that the label gripper assembly reciprocates along a path of travel from the mandrel 60 to the labeling station 32. The crank arm 230 is adjustably connected to the connecting rod 234 so that the stroke of the support frame can be altered as desired. This adjustment is utilized in order to permit placement of labels on different containers having various heights, within predetermined limits.

The label gripper assembly 204 comprises a pair of gripper jaw mechanisms 250 each supported on a respective one of the support shafts 210 by a respective gripper support assembly 252. The gripper jaw mechanisms 250 and gripper jaw support assemblies 252 are identical and accordingly, only one each of these assemblies is described in detail. Referring to FIGS. 7 and 8, the gripper jaw assembly 250 is formed by a base plate 260, a fixed jaw member 262 attached to the base plate 260, a movable jaw 264 and a jaw actuator mechanism 266.

The fixed jaw member 262 is formed by a support body 270 which is screwed to the base plate and a semi-cylindrical cuff-like jaw 272 which extends upwardly from the support body 270. The jaw 272 has a radius of curvature which is smaller than that of the inner wall of the mandrel 60 and, when the gripper jaw mechanisms 250 are positioned for gripping a label supported on the mandrel 60, the jaw 272 extends upwardly within and closely adjacent the wall of the mandrel while the movable jaw 264 is positioned outside of the mandrel and the label.

The movable jaw 264 has a curved inner face which is curved toward the curvature of the fixed jaw 264 and projecting gripper pads 274 which are aligned with the mandrel cut outs 76 so that when the movable jaw is actuated toward engagement with the fixed jaw, the label at the end of the mandrel is gripped between the gripper pads 274 and the cylindrical surface of the fixed jaw 272.

The jaw actuator mechanism 266 includes actuating rods 276 fixed to the movable jaw 264, guide blocks 280, 282, 284 fixed to the base plate 260 through which the actuating rods 276 extend, biasing springs 286 which react between the actuating rods and the guide block 282 to urge the movable jaw 264 toward engagement with the fixed jaw, a pneumatic piston cylinder actuator 290, and a mechanical actuator 292. The mechanical actuator and the pneumatic actuator are each operable to overcome the biasing force of the springs 286 to open the jaws.

The biasing springs 286 are preferably helical compression springs which are compressed between the guide block 282 and collars 294 which are secured to the actuator rods 276. The force of the compression spring is such that the movable and fixed gripper jaws are firmly engaged at all times when the force of the springs has not been overcome either by the pneumatic actuator 290 or the mechanical actuator 292.

The pneumatic actuator cylinder is fixed to the guide block 282 and its piston is engagable with a stop 296 fixed to the actuating arms 276. When the pneumatic actuator 290 is supplied with air under pressure, the piston is extended causing the rods 276 and movable jaw 264 to be retracted from the fixed jaw. When the pneumatic actuator cylinder is vented to atmosphere, the springs 286 abruptly reclose the jaws. The strength of the springs is such that the jaws are closed nearly instantaneously when the pneumatic actuator is vented. The pneumatic actuator is shown supplied with air under pressure through a suitable hose with the supply of air and venting the cylinder being controlled by a conventional electrically operated valve which is not illustrated.

The mechanical jaw actuator 292 is effective to rapidly open the jaw against the biasing springs 286 to release a label which has been placed on a container at the labeling station. The preferred mechanical jaw actuator comprises a body 300 which is secured to the rods 276 and which forms a pivot 302 for an operating lever 304 depending from the pivot. The lever 304 carries a cam follower roller 306 at its oppposite, depending end and works against a fulcrum formed by the base plate 260. As the cam follower roller is moved laterally in the direction of the container at the labeling station, the lever 304 pivots about the fulcrum and draws the body 300 laterally in a direction away from the container to open the jaws.

The mechanical actuator is associated with a cam plate 310 (FIGS. 3 and 4) fixed to the horizontal support face 23 and extending upwardly from it. The cam plate 310 defines a cam ramp 312 which is positioned in vertical relationship with the labeling station and the cam follower roller 306 so that when the label has reached the proper position about the container, the cam follower roller 306 rides over the cam ramp 312 to effect abrupt opening of the jaws and release of the label. The illustrated cam 310 is vertically adjustable to enable accommodation of different containers and/or labels.

FIGS. 7 and 8 illustrate the gripper jaws in their closed positions with the projecting ends of the fixed jaws engaged. The engaged fixed jaws form a cylindrical configuration. This is the condition of the gripper jaw mechanisms 250 when they grip a label disposed on the mandrel 60. The engaged fixed jaws extend just within the interior of the mandrel so that when the label is clamped between the fixed and movable jaws the label material is not unduly stressed.

The labels 11 are typically applied to containers having a larger diametrical extent than the mandrel 60 and accordingly the gripper jaw mechanisms 250 must be laterally separated from each other in order to assemble a label about a container at the labeling station. The gripper support assemblies 252 are constructed to enable lateral separation of the gripper jaw mechanisms 250 as they grip and move labels toward containers at labeling station. The gripper support assembly 252 (FIGS. 3 and 4) comprises a support base member 320 which is fixed to a respective one of the support shafts 210 and a jaw articulating member 322 supported by the base 320 and which in turn supports the respective gripper jaw mechaism 250. The base member 320 carries fixed guide rods 324 which extend horizontally relative to the base and the member 322 is slidably mounted on the rods 324 for movement laterally relative to the support base 320. The member 322 is provided with a supporting lip 328 to which the gripper jaw mechanism 250 is attached. Each of a pair of biasing springs 330 is around a different one of the rods 324. The springs act against the articulating members 322.

The jaw articulating member 322 carries a cam follower roller 332 (FIG. 4) which coacts with a cam plate 334 supported upon the support base 323. The cam plate 334 is provided with a cam ramp 336 engageable with the roller 332 and the cam ramp 336 is configured to provide for movement of the gripper jaw assembly laterally away from the profile of a container at the label applying station while the label remains gripped between the gripper jaws. This operation of the gripper support assembly 252 enables opening the label to a diametrical extent larger than the container and thus facilitates positioning the label about the container at the labeling station particularly in cases where the label is resiliently expanded onto the container.

Operation of the label applying mechanism during a complete cycle of its operation as follows: Assuming that the gripper jaw mechanism 250 is at the bottom of its stroke and that a label has just been applied to a container at the labeling station 32, the gripper jaw mechanism 250 is in a condition in which the cam plate 310 has actuated the mechanical jaw actuator 292 to open the jaws 262, 264. At the same time, the cam plate 334 remains in contact with the articulating member cam follower 332 so that the gripper jaw mechanisms are spaced laterally from each other. Their spacing, incidentally, is not sufficiently great that containers can be indexed into or from the labeling station 32.

As the gripper jaw mechanisms begin to move upwardly from the bottom of their stroke, the pneumatic actuator 290 is supplied with pressurized air through its control valve and coacts with the mechanical actuator 292 to maintain the jaws open. As the gripper jaw mechanisms continue to move upwardly, the mechanical actuator 292 moves away from the cam plate 310; but the gripper jaws remain opened by action of the pneumatic actuator 290. The gripper jaw mechanisms are maintained open and spaced as they continue to move upwardly until the articulating member cam follower 332 passes across the cam ramp 336 whereupon the gripper jaws are moved into engagement with each other (FIG. 7) by the biasing springs 330.

The gripper jaw mechanisms continue moving upwardly while decelerating. When the gripper jaw mechanisms reach the top of their stroke, the fixed jaws are disposed inside the mandrel and the pneumatic actuator 290 is vented. The biasing springs 286 immediately close the jaws to grip the label on the mandrel 60. As the jaws begin their downward movement, the web of labels is pulled downwardly over the mandrel until an index mark on the next succeeding label is detected by the detector 64 and the web brakes 66 are engaged so that to sever the label gripped by the jaws is severed from the web.

The gripper jaw mechanisms, with the separated label in tow, continue moving downwardly from the mandrel and the jaw articulating member 322 is actuated by its associated cam plate 334 to move the gripper jaw mechanisms apart. The label is moved over a container at the label applying station and pulled downwardly along the container by the gripper jaw mechanisms until the mechanism jaw actuator 292 is again operated by its associated cam plate 310 to open the gripper jaws and release the label in position on the container.

An important feature of apparatus 10 constructed according to the present invention is that the operation of various of its components can be easily correlated. This is particularly true of operation of the label applying mechanism 40 and the container directing unit 34 whose functions must be coordinated so that the containers are fed to the labeling station only during that portion of operation when the gripper mechanisms 250 are above the height of the containers. The timing of this operation is thus critical because the gripper mechanisms 250 may be disposed above the containers during only a small part of their cycle of operation. The controller system 44 coordinates these functions as well as controlling the timing of other component operations such as actuation of the gripper jaws by the pneumatic actuator 290.

Figure 9:
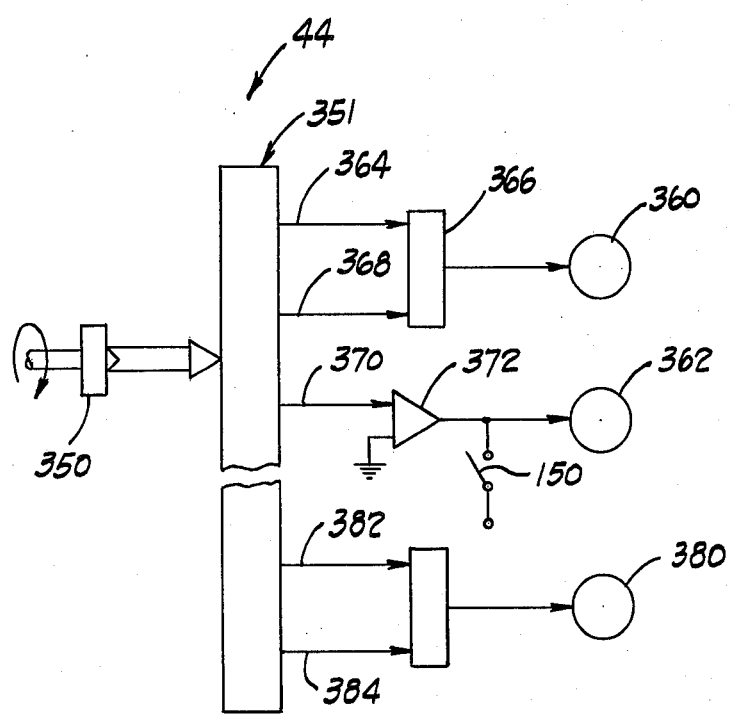
FIG. 9 is a schematic diagram of a controller system for the apparatus of FIG. 1.

Referring now to FIG. 9, a schematic representation of the controller system 44 is illustrated. The system 44 comprises a digital encoder 350 and an electrical logic unit 351 which receives input signals from the encoder 350 and produces output signals at precisely determined times during each cycle of the apparatus 10. The encoder 350 is of conventional construction and, as illustrated by FIG. 4, is driven by a timing belt 352 which is reeved around a pulley driven by the drive shaft for the crank 230. The digital encoder 350 produces a series of distinct electrical impulses during each revolution of the crank 230. Accordingly, for each digital signal produced by the encoder 350 there exists a precise position of the crank 230 (and therefore the frame 200 and associated components).

The output from the encoder 350 is fed to the logic unit 351 which can be of any suitable or desirable construction and is therefore not illustrated in detail. The logic unit 351 responds to predetermined signals from the encoder 350 to produce output control signals at precise times during the cycle of the apparatus. The logic unit can produce a large number of outputs and, for the sake of simplicity, only three output utilization devices are disclosed in connection with FIG. 9.

Referring to FIG. 9, the logic unit 351 is illustrated as governing operation of an electrically energized valve controller 360 which to controls operation of the control valve for the actuator 290 between a condition wherein the valve supplies pressurized air to the actuator 290 and a condition wherein the valve vents the actuator to atmosphere. The logic circuitry 351 is adjusted so that when the gripper jaw mechanisms reach a predetermined position substantially at the bottom of their stroke, the position signal generated by the digital encoder 350 is responded to by the logic unit 351 by producing an output on a line 364 to output circuitry 366. The circuitry 366 produces an output signal for energizing a valve controller 360 which conditions the valve to supply pressurized air to the actuator 290. When the gripper jaw assemblies reach the top of their stroke, the signal produced by the digital encoder 350 causes the logic unit 351 to produce an output on a line 368 to the output circuitry 366 which deenergizes the valve controller 360 so that the control valve vents the actuator 290 to atmosphere permitting the gripper jaws to be immediately closed and thus grip the label on the mandrel 60.

As noted previously, the operation of pneumatic actuators tends to be unduly slow in most instances, but in the case of the apparatus 10, rapid operation of the actuator 290 is not critical. The only requirement for high speed operation of the actuator 290 is that it be effective to open the jaws during the time the gripper jaw mechanisms move from their lowermost positions to the upper ends of their strokes. The actuator 290 is easily capable of operating as intended during that period of time. On the other hand, when the control valve for the actuator 290 is operated to vent the actuator, the jaw actuating springs are immediately effective to close the jaws.

The illustrated control system 44 is also constructed to govern initiation of each cycle of the container directing unit 34. As illustrated by FIG. 9, the container directing clutch 122 is operated by a controller 362. When the gripper jaw mechanisms 250 are elevated to a position just high enough to permit containers to be moved to and away from the labeling station 32, the digital encoder 350 produces an output signal which causes the logic unit 351 to produce a momentary output signal on a line 370. The signal on the line 370 is illustrated as being input to a buffer 372 which produces a momentary output effective to energize the clutch controller 362. As soon as the clutch is energized and engaged, the mechanical control switch 150 is closed to effectively complete a holding circuit for the controller 362 so that the container directing unit 34 continues to operate throughout a complete cycle of its operation. It should be apparent that gearing ratios between the drive unit 42 and the assembly 40 and unit 34 are sufficiently different that the unit 34 is driven through a cycle of its operation much more quickly than the assembly 40.

Lastly, a controller 380 for the indicia detector 64 is illustrated as being operated from the logic unit 351 in response to outputs from the digital encoder 350. In some circumstances, indicia detectors can be sensitive to other radiation (e.g., from indicia applied for manufacturing purposes) incident upon the detector during normal operation. In such circumstances, it may be desirable to operate the detector only within a short "window" of time during which labels 11 are moved along the mandrel 60. In accordance with FIG. 9, the encoder 350 produces an output signal just as the gripper mechanisms grip a label on the mandrel 60. A resultant signal is produced by the unit 351 on a line 382 to initiate operation of the indicia detector controller 380. A second signal is produced on the line 384 to terminate operation of the indicia detector when the gripper jaws have proceeded a predetermined distance downwardly from the mandrel 60.

It should be appreciated that the logic unit 351 can be adjusted to respond to different outputs from the encoder 350. This enables adjustments in the timing of operation of the apparatus to accommodate different shapes and sizes of containers and/or labels. Likewise, the cams 310, 334 can be adjusted or even replaced by cams having different configurations for accommodating different containers. Additionally, containers having various cross sectional shapes can be provided with labels simply by replacing the mandrel 60 and jaws 262, 264 with appropriately shaped elements.

While a single embodiment of the present invention has been illustrated and described herein in considerble detail, the present invention is not to be considered limited to the precise construction disclosed. Various adaptions, modifications and uses of the invention may occur to those skilled in the art to which the invention relates and the invention is to cover hereby all such adaptations, modifications and uses which fall within the spirit or scope of the appended claims.

We claim:
1. A process of labeling containers comprising:
   (a) bringing a plurality of containers into abutment in a row along a path;

(b) positioning one of the containers in the row at a labeling station;

(c) establishing a pressure differential on the one container with a stationary support at the labeling station;

(d) applying a label to the one container by sliding a sleeve over the one container;

(e) pushing the row of containers along the path and thereby removing the one container from the station and positioning another container at the station;

(f) applying a sleeve to said another container after it has been positioned at the station and a pressure differential has been applied to it.

2. The process of claim 1 wherein the process is performed by a machine and wherein the pushing step expels a container from the machine which expelled container has been labeled.

3. The process of claim 1 further including the step of, as said one bottle is being labeled, placing still another bottle in position to be added to the row.

4. The process of applying labels to bottles with a machine comprising:
  (a) successively positioning each of a plurality of bottles at a work station; and,
  (b) with a stationary bottle support applying a sleeve label to each bottle as it is positioned at the work station by:
    (i) applying a pressure differential to the positioned bottle to secure and stabilize it at the station;
    (ii) spreading the end one of a chain of interconnected label sleeves and concurrently placing it in a clamp station;
    (iii) grasping the spread sleeve end with a pair of driven clamps;
    (iv) moving the clamps toward the work station to move the end sleeve toward the work station while concurrently spreading the next sleeve in the chain over a mandrel;
    (v) sensing the arrival of the next sleeve at the clamp station and thereupon braking the next sleeve of the chain so that the clamp movement causes said end sleeve to separate from the next sleeve;
    (vi) continuing the clamp movement toward the work station until the end sleeve has been pulled over the bottle to a desired extent and then releasing the clamp grasp to leave the end sleeve on the positioned bottle in a desired orientation; and,
    (vii) returning the clamps to the clamp station.

5. The process of claim 4 further including the step of stretching the end sleeve as it is lowered.

6. The process of claim 5 wherein the stretching is effected before the label is pulled over the bottle.

7. The process of claim 4 wherein the clamps are moved toward one another during the return step.

8. The process of claim 4 wherein the step of releasing the clamp grasp is effected with a spaced pair of cams.

9. The process of applying labels to bottles with a machine having a through passage comprising:
  (a) feeding a plurality of bottles to the machine with a container delivery conveyor;
  (b) pushing a first bottle into the passage with a harmonically driven L shaped pusher plate while concurrently using the plate to block the bottle feeding by the delivery conveyor;

(c) returning the pusher plate to its original position and feeding a second bottle into a space between the first bottle and the pusher plate;
  (d) pushing the second bottle into the passage and thereby causing the second bottle to push the first further into the passage;
  (e) repeating steps (c) and (d) with other bottles while guiding the pushed bottles along a predetermined path through the passage which path includes a work station;
  (f) applying a sleeve label to each bottle as it is positioned at the work station by:
    (i) with a stationary bottle support applying a pressure differential to the positioned bottle to secure and stabilize it at the station;
    (ii) spreading the end one of a chain of interconnected label sleeves and concurrently placing it in a clamp station;
    (iii) grasping the spread end sleeve with a pair of harmonically driven clamps;
    (iv) moving the clamps toward the work station to move the end label toward the work station while concurrently spreading the next sleeve in the chain over a mandrel;
    (v) sensing the arrival of the next sleeve at the clamp station and thereupon braking the next sleeve of the chain so that the clamp movement causes said end sleeve to separate from the next sleeve;
    (vi) continuing the clamp movement toward the work station until the end sleeve has been pulled over the bottle to a desired extent and then releasing the clamp grasp to leave the end sleeve on the positioned bottle in a desired orientation; and,
    (vii) returning the clamps to the clamp station;
  (g) coordinating the repetition of pushing step (d) with the label application of steps (f) such the pushing of the bottles and the attendant movement along the predetermined path occurs when the clamps are at or near the clamp station.

10. The process of claim 9 further including the step of removing labeled bottles from the machine with a container feed conveyor after the labeled bottles are pushed from the machine.

11. A bottle feed mechanism for use in a labeling machine or the like comprising:
  (a) a guide defining a path of rectilinear travel;
  (b) an L shaped pusher plate journaled on the guide for rectilinear movement from a rest position to a bottle pushed position and return;
  (c) a plate drive assembly for causing selective reciprocation of the plate along the guide;
  (d) the assembly including a clutch; and,
  (e) a control means for sensing a condition when plate reciprocation is desired and causing the clutch to be actuated in response to such sensed condition.

12. The mechanism of claim 11 wherein the drive assembly drives the plate with a harmonic motion.

13. A bottle labeling machine comprising:
  (a) a housing and frame structure defining a through passage having a work station therein;
  (b) guide mechanism establishing a path of bottle travel through the passage to and past the work station;
  (c) a stationary bottle support along the path of travel and at the work station;

(d) a cyclically moveable bottle pusher for pushing bottles sequentially onto the path and thereby advancing a row of bottles along the path a distance during each cycle equal to a whole integer multiple of a diameter of one of the bottles being pushed;

(e) a vacuum source connected to the bottle support for establishing a pressure differential on a bottle positioned at the work station and on the support; and, (f) a labeling assembly supported by the housing and frame structure for applying labels to bottles positioned at the work station.

14. In a label applying machine an improved label applying mechanism comprising:

(a) reciprocatable clamps each including at least two coactable lable gripping jaws and spaced cams positioned to coact with the clamps and effect clamp and clamp jaw movement as the clamps are reciprocated;

(b) said cams and clamps having coacting surfaces effective to effect the following:

(i) to clamp a label positioned at a clamp station when the clamps are at or near an extreme of their movement;

(ii) to move the clamps away from one another and stretch a clamped label as the clamps move toward a label applying work station;

(iii) to open the clamps to release a label when such label has been positioned on an object at the labeling station; and, (iv) to move the clamps toward one another to position one jaw of each clamp to pass into and the other jaw of each clamp to be outside of another label as the clamps move toward the clamp station.

15. A bottle labeling machine comprising:

(a) a housing and frame structure defining a through passage having a work station therein;

(b) guide mechanism establishing a path of bottle travel through the passage to and past the work station;

(c) an apertured bottle support along the path of travel and at the work station;

(d) a cyclically moveable bottle pusher for pushing bottles sequentially onto the path and thereby advancing a row of bottles along the path a distance during each cycle equal to a whole integer multiple of a diameter of one of the bottles being pushed;

(e) a vacuum source connected to the bottle support for establishing a pressure differential on a bottle positioned at the work station and on the support; and, (f) a labeling assembly supported by the housing frame structure in spaced relationship with the work station and comprising:

(i) a label supply for providing a web of interconnected tubular labels to be fed along a label supply path to a clamp station;

(ii) a mandrel along the label path and including surfaces adapted to open each label as labels are successively moved along the label path;

(iii) a moveable label applying mechanism including spaced moveable clamps and a clamp drive;

(iv) the label applying mechanism including spaced cams positioned to coact with the clamps and effect clamp and clamp jaw movement as the clamps are moved as follows:

(aa) to clamp a label positioned at the clamp station when the clamps are at or near an extreme of their movement;

(bb) to move the clamps away from one another and stretch a clamped label as the clamps move toward the work station;

(cc) to open the clamps to release a label when such label has been positioned on a bottle; and, (dd) to move the clamps toward one another to position one jaw of each clamp to pass into and the other jaw of each clamp to be outside of another label as the clamps move toward the clamp station;

(v) a detector for sensing the presence of a second label at the clamp station as an end label of a web is pulled along the label path by the clamps and to emit a signal in response to such sensing; and, (vi) brake means connected to the detector for braking a web each time the detector emits a signal in response to such sensing.

16. A bottle labeling machine comprising:

(a) a housing and frame structure defining a through passage having a work station therein;

(b) guide mechanism establishing a path of bottle travel through the passage to and past the work station;

(c) an apertured bottle support along the path of travel and at the work station;

(d) a cyclically moveable bottle pusher for pushing bottles sequentially onto the path and thereby advancing a row of bottles along the path a distance during each cycle equal to a whole integer multiple of a diameter of one of the bottles being pushed;

(e) a vacuum source connected to the bottle support for establishing a pressure differential on a bottle positioned at the work station and on the support; and, (f) a labeling assembly supported by the housing and frame structure above the work station and comprising:

(i) a label supply for providing a web of interconnected tubular labels to be fed along a label supply path to a clamp station;

(ii) a mandrel along the label path and including surfaces adapted to open each label as labels are successively moved along the label path;

(iii) a vertically moveable label supplying mechanism including spaced pairs of vertically reciprocal clamps and a clamp reciprocating drive;

(iv) the label applying mechanism including spaced pairs of cam sets positoned to coact with the clamps and effect clamp and clamp jaw movement as the clamps are reciprocated as follows:

(aa) to clamp a label positioned at the clamp station when the clamps are at or near the top of their movement;

(bb) to move the clamps away from one another and stretch a clamped label as the clamps move downwardly toward the work station;

(cc) to open the clamps to release a label when such label has been positioned on a bottle; and, (dd) to move the clamps toward one another to position one jaw of each clamp to pass into and the other jaw of each clamp to be outside of another label as the clamps move upwardly toward the clamp station;

(v) a detector for sensing the presence of a second label at the clamp station as an end label of a web is pulled downwardly by the clamps and to emit a signal in response to such sensing; and, (vi) a pair of web brakes connected to the detector for braking a web each time the detector emits a signal in response to such sensing.

17. A clamp assembly for use in placing label sleeves on bottles comprising:
   (a) a body including a base and a moveable jaw guide;
   (b) the body also including a fixed jaw;
   (c) a moveable jaw mounted on the body for movement along the jaw guide between label clamped and label release positions;
   (d) biasing means urging the moveable jaw toward its clamped position and applying label clamping pressure when the moveable jaw is in its clamped position;
   (e) a first actuator for moving the moveable jaw against the biasing means to effect label release when a label is positioned on a bottle; and,
   (f) another actuator for holding the moveable jaw in its label release position as the assembly is positioned to clamp a label.

18. The assembly of claim 17 wherein the first actuator includes a cam operated lever.

19. A clamp assembly for use in a machine for applying bottle labels comprising:
   (a) a support portion including a section guidingly mounted for reciprocation between label supply and label positioned locations;
   (b) the support portion also including a clamp support section for supporting the remainder of the assembly;
   (c) an elongated clamp base mounted on the arm section and carrying a fixed clamp near one end;
   (d) a jaw guide mounted on the base and extending from a location near the fixed jaw toward the other end of the base;
   (e) a moveable jaw slideably mounted on the guide for movement between a label clamped and a label release position;
   (f) a spring in biasing relationship with the moveable jaw to urge it toward its label clamped position;
   (g) a fluid actuator connected to the moveable jaw for positioning the moveable jaw in its label release position prior to the clamping of a label and for allowing the spring to cause the moveable jaw to move into its label clamped position;
   (h) a cam lever pivotably mounted in the body near its other end; and,
   (i) a linkage operatively interconnecting the moveable jaw and the cam to lever such that when the cam lever is actuated by a coacting cam the force of the spring is overcome and the moveable jaw is moved to its label release position.

20. A clamp assembly for use in a machine for applying bottle labels comprising:
   (a) a support portion including a section guidingly mounted for reciprocation between label supply and label positioned locations;
   (b) the support portion also including a clamp support arm section for supporting the remainder of the assembly;
   (c) an elongated clamp base mounted on the arm section and carrying a fixed clamp near one end;
   (d) a pair of guide rods mounted on the base and extending from a location near the fixed jaw toward the other end of the base;
   (e) a moveable jaw slideably mounted on the guide rods for movement between a label clamped and a label release position;
   (f) a pair of coil springs around the rods and in biasing relationship with the moveable jaw to urge it toward its label clamped position;
   (g) an air actuator connected to the moveable jaw for positioning the moveable jaw in its label release position prior to the clamping of a label and for allowing the springs to cause the moveable jaw to move into its label clamped position when the air actuator is vented;
   (h) a cam lever pivotably mounted in the base near its other end; and,
   (i) a linkage operatively interconnecting the moveable jaw and the cam lever such that when the cam lever is actuated by a coacting cam the force of the springs is overcome and the moveable jaw is moved to its label release position.

21. The assembly of claim 20 wherein a cam follower roller is rotatably mounted on the cam lever.

22. A product labeling machine comprising:
   (a) a housing and frame structure defining a work station;
   (b) guide mechanism establishing a path of product travel to and past the work station;
   (c) a stationary apertured product support along the path of travel and at the work station;
   (d) a cyclically moveable product mover for moving products sequentially onto the path and thereby advancing products along the path a distance during each cycle equal to a whole integer multiple of a diameter of one of the products being moved;
   (e) a vacuum source connected to the product support for establishing a pressure differential on a product positioned at the work station; and
   (f) a labeling assembly supported by the housing frame structure in spaced relationship with the work station and comprising:
      (i) a label supply for providing a web of interconnected tubular labels to be fed along a label supply path to a clamp station;
      (ii) a mandrel along the label path and including surfaces adapted to open each label as labels are successively moved along the label path;
      (iii) a moveable label applying mechanism including spaced moveable clamps each having a plurality of jaws and a clamp drive; and,
      (iv) the label applying mechanism including cam means positioned to coact with the clamps and effect clamp and clamp jaw movement as the clamps are moved as follows:
         (aa) to clamp a label positioned at the clamp station when the clamps are at or near an extreme of their movement;
         (bb) to move the clamps away from one another and stretch a clamped label;
         (cc) to open the clamps to release a label when such label has been positioned on a bottle; and,
         (dd) to move the clamps to position one jaw of each clamp to pass into and another jaw of each clamp to be outside of another label as the clamps move toward the clamp station;
      (v) a detector for sensing the presence of a second label at the clamp station as an end label of a web is pulled along the label path by the clamps and to emit a signal in response to such sensing; and, (vi) brake means responsive to the detector for braking a web each time the detector emits a signal in response to such sensing.

23. A clamp assembly for use in a machine for applying labels comprising:
   (a) a support portion including a section guidingly mounted for reciprocation between label supply and label positioned locations;
   (b) the support portion also including a clamp support arm section for supporting the remainder of the assembly;
   (c) an elongated clamp base mounted on the arm section and carrying a first clamp jaw;
   (d) guides mounted on the base and extending from a location near the first jaw toward the other end of the base;
   (e) a moveable jaw in slideable engagement with the guides for movement between a label clamped and a label release position;
   (f) a spring in biasing relationship with the moveable jaw to urge it toward its label clamped position;
   (g) an actuator connected to the moveable jaw for positioning the moveable jaw in its label release position prior to the clamping of a label and for allowing the spring to cause the moveable jaw to move into its label clamped position when the actuator is deactuated;
   (h) a cam coacter mounted on the base; and,
   (i) a linkage operatively interconnecting the moveable jaw and the cam coacter such that when the cam coacter is actuated by a coacting cam, the force of the spring is overcome and the moveable jaw is moved to its label release position.

24. In an apparatus for assembling tubular labels on containers:
   (a) a label system for storing tubular labels;
   (b) structure defining a labeling station;
   (c) label feeding means for positioning a label adjacent said labeling station;
   (d) container directing means for directing each of a succession of containers to the labeling station;
   (e) label applying means comprising a label gripper mechanism moveable between said label feeding means and said labeling station, said gripper mechanism effective to grip a label positioned by said label feeding means and move the label to the labeling station;
   (f) drive means for said label gripper mechanism comprising a drive motor and a drive transmission connecting said drive motor to said label gripper mechanism, said transmission being constructed to impart harmonic motion to said gripper mechanism so that said gripper mechanism moves harmonically along said path of travel;
   (g) cam means coacting with said gripper mechanism during its motion along said path of travel to effect manipulation of said label onto a container;
   (h) said label gripper mechanism including first and second relatively moveable label clamping jaws actuatable between an open position and a closed position wherein the jaws grip a label between them, said jaws being biased toward the closed position by springs means; and,
   (i) said cam means including a cam member coactable with said gripper mechanism to effect opening of said jaws against the force of said spring means when said gripper mechanism is at a predetermined position with respect to said labeling station so that a label gripped by said jaws is released.

25. In an apparatus for assembling tubular labels on containers:
   (a) a label system for storing tubular labels;
   (b) structure defining a labeling station;
   (c) label feeding means for positioning a label adjacent said labeling station;
   (d) container directing means for directing each of a succession of containers to the labeling station;
   (e) label applying means comprising a label gripper mechanism moveable between said label feeding means and said labeling station, said gripper mechanism effective to grip a label positioned by said label feeding means and move the label to the labeling station;
   (f) drive means for said label gripper mechanism comprising a drive motor and a drive transmission connecting said drive motor to said label gripper mechanism, said transmission being constructed to impart harmonic motion to said gripper mechanism so that said gripper mechanism moves harmonically along said path of travel;
   (g) cam means coacting with said gripper mechanism during its motion along said path of travel to effect manipulation of said label onto a container;
   (h) an electrical signal generator driven from said drive means in timed relation to motion of said gripper mechanism to produce electrical signals corresponding to gripper mechanism positions along said path of travel; and
   (i) signal responsive means for effecting operation of said container directing means when said gripper mechanism is at a predetermined location along said path of travel.

26. Apparatus for applying tubular labels to containers comprising:
   (a) structure defining a labeling station;
   (b) container directing means for directing a succession of containers to the labeling station;
   (c) label feeding means for positioning individual labels at a predetermined position with respect to said labeling station;
   (d) label applying means including a label engaging mechanism cyclically moveable along a path of travel for removing a label from said feeding means and assembling the label about a container at a labeling station;
   (e) drive means for imparting harmonic motion to said label engaging mechanism;
   (f) a second drive transmission between said drive means and said container directing means for operating said container directing means from said drive means in timed relation to motion of said label engaging mechanism;
   (g) said second drive transmission including a clutch engageable to effect operation of said container advancing means during a portion of each cycle of operation of said label engaging mechanism; and,
   (h) controller means for governing operation of said clutch, said controller means including electrical signal producing means coacting with said drive means to produce an electrical signal when said label engaging mechanism is at a predetermined position on said path of travel and said controller means being adapted to effect engagement of said clutch in response to said signal.

27. A process of labeling containers comprising:

(a) bringing a plurality of products into abutment in a row along a path;
(b) positioning one of the products at a labeling station;
(c) establishing a pressure differential on the one product with a stationary product support at the labeling station;
(d) applying a label to the one product by sliding a sleeve over the one product;
(e) removing the one product from the station and positioning another product at the station; and,
(f) applying a sleeve to said another product after it has been positioned at the station and a pressure differential has been applied to it.

28. In an apparatus for applying tubular labels to containers, label applying means for removing successive labels from a label supply and assembling each label on a respective container, said label applying means comprising:
(a) first and second relatively movable label gripper jaws having a closed position for gripping a label therebetween and an open position for releasing the label;
(b) gripper jaw actuator means comprising:
   (i) spring means for urging said jaws to the closed position;
   (ii) a member movable to open said jaws against the force of said spring means;
(c) gripper jaws supporting means for moving said gripper jaws cyclically along a predetermined path of travel;
(d) cam means coacting with said movable member to open said jaws and release said label when the label is assembled to a container, said gripper jaw actuator means further including a fluid operated actuator effective to maintain said jaws open against the force of said spring means as said jaws move from the labeling station to the label supply; and
(e) said fluid operated actuator being rendered ineffective to oppose the force of said spring means when said jaws are positioned to grip a label from the label supply.

29. A process of labeling containers comprising:
(a) bringing a plurality of products into abutment in a row along a path;
(b) moving the row of products along the path;
(c) positioning the one product at a labeling station by establishing a pressure differential on the one product when at the one station;
(d) applying a label to the one product by sliding a sleeve over the one product;
(e) removing the one product from the station and positioning another product at the station; and,
(f) applying a sleeve to said another product after it has been positioned at the station and a pressure differential has been applied to it.

* * * * *